US009695963B2

(12) United States Patent
Rieth (10) Patent No.: US 9,695,963 B2
(45) Date of Patent: Jul. 4, 2017

(54) TUBE-FITTING-ASSEMBLY FERRULE (71) Applicant: Patrick L. Rieth, Hammond, LA (US)

(72) Inventor: Patrick L. Rieth, Hammond, LA (US)

(*) Notice: Subject to any disclaimer, the term of this patent is extended or adjusted under 35 U.S.C. 154(b) by 0 days.

(21) Appl. No.: 14/971,439

(22) Filed: Dec. 16, 2015

(65) Prior Publication Data
US 2016/0102789 A1    Apr. 14, 2016

Related U.S. Application Data (60) Continuation-in-part of application No. 14/288,292, filed on May 27, 2014, now Pat. No. 9,273,808, which is a division of application No. 13/068,391, filed on May 10, 2011, now Pat. No. 8,769,798.

(51) Int. Cl.
*F16L 19/02* (2006.01)
*F16L 19/065* (2006.01)

(52) U.S. Cl.
CPC ......... *F16L 19/0206* (2013.01); *F16L 19/065* (2013.01); *Y10T 29/49904* (2015.01); *Y10T 29/49908* (2015.01); *Y10T 29/49909* (2015.01); *Y10T 29/49927* (2015.01); *Y10T 29/49938* (2015.01); *Y10T 29/49947* (2015.01); *Y10T 29/49948* (2015.01); *Y10T 29/53843* (2015.01); *Y10T 29/53848* (2015.01); *Y10T 29/53952* (2015.01); *Y10T 29/53987* (2015.01)

(58) Field of Classification Search
CPC .............. F16L 19/0206; F16L 19/065; Y10T 29/49904; Y10T 29/49908; Y10T 29/49909; Y10T 29/49927; Y10T 29/49938; Y10T 29/49947; Y10T 29/49948; Y10T 29/53843; Y10T 29/53848; Y10T 29/53952; Y10T 29/53987
See application file for complete search history.

(56) References Cited

U.S. PATENT DOCUMENTS

| 3,866,958 | A | 2/1975 | Gold |
| 2008/0007048 | A1 | 1/2008 | Benoit et al. |
| 2012/0038150 | A1 | 2/2012 | Williams et al. |
| 2012/0228872 | A1* | 9/2012 | Gamache ............ F16L 19/065 285/331 |
| 2012/0284998 | A1 | 11/2012 | Rieth |
| 2013/0193683 | A1 | 8/2013 | Seto et al. |
| 2015/0167870 | A1 | 6/2015 | Fukaya et al. |

FOREIGN PATENT DOCUMENTS

GB    1517091    7/1978

* cited by examiner

*Primary Examiner* — John C Hong
(74) *Attorney, Agent, or Firm* — Keaty Law Firm, LLC (57) ABSTRACT

A tube-fitting-assembly ferrule apparatus and method to secure connections between tubing sections against high pressure, vibration, pulsation, and hammering, by providing a tube-fitting-assembly ferrule which elastically deforms in use, securing the primary circumferential point seal with a shock-absorbing and shape-retaining force.

17 Claims, 8 Drawing Sheets

FIG. 9

TUBE-FITTING-ASSEMBLY FERRULE

CROSS-REFERENCE TO RELATED APPLICATIONS

This application is a continuation-in-part of my application Ser. No. 14/288,292 filed on May 27, 2014 and entitled "Tube Fitting Assembly," which issued as U.S. Pat. No. 9,273,808 on Mar. 1, 2016, and which is a divisional of application Ser. No. 13/068,391 filed on May 10, 2011, which issued as U.S. Pat. No. 8,769,798 on Jul. 8, 2014 for a "Tube Fitting Assembly," the full disclosures of which are incorporated by reference herein and priority of which is hereby claimed.

BACKGROUND OF THE INVENTION

This invention relates generally to the sealing of fittings about tubes and, more particularly, though not exclusively, to the sealing of tubing being a tube gripping member, such as a ferrule.

Tube fittings are used to join or connect a tube end to another member, whether that other member be another tube end or a device in fluid communication with the tube end. Generally, tube fittings are designed to withstand operational conditions of the environment where the tube is located, such as pressure, vacuum, pull-out pressure, temperature, pulsation, and/or vibration. Ideally, a tube fitting grips the tube end so as to prevent loss of seal between the tube and another member. A good tube fitting maintains a leak-free connection between the tube and another member.

Some tube fittings are designed to be used with plastic tubes, while others are used with metal tubing, such as stainless steel pipes/tubes. While the design criteria for these applications may differ, the basic concepts of this invention may be applicable to both. Typically, stainless steel and other metal tubing is used for high-pressure applications in which the tubing wall thickness is substantial. Such heavy wall tubing is difficult to grip because it is not only hard, but also resistant to deformation. Such physical characteristics make it more difficult to deform the tubing plastically so as to achieve a desired tube grip.

Tube fittings usually include an assembly of a tube gripping device, which can be a single or multiple ferrules, and a pull-up member for causing the tube gripping device to be installed on a tube end so as to grip the tube end and create a leak-free seal. The pull-up member can be a threaded nut that is tightly engaged with the body of a member, to which the tubing is connected. The pull-up mechanism most commonly used is a threaded connection of a female threaded nut and a male threaded body component, both of which act upon the ferrule as the nut and the body are threaded together. In such arrangement, the front end of the ferrule is sandwiched between the tube and the body to form a sealing member.

Conventional ferrule fittings are inserted into a space between an outer surface of the tubing and an inner surface of the body. The body is formed with a frustoconical camming surface, which a front end of the ferrule contacts. In many known fitting assemblies, the resulting seal is less than adequate, requiring one or more elastomeric seals to prevent leakage of the liquid or gas.

The present invention contemplates elimination of drawbacks associated with convention tube fitting, and provides a ferrule seal assembly that effectively seals the interface between the end of the tubing and a body.

BRIEF DESCRIPTION OF DRAWINGS

Reference will now be made to the drawings, wherein like parts are designated by like numerals, and wherein.

SUMMARY OF THE INVENTION

It is, therefore, an object of the present invention to provide a ferrule seal assembly that meets high performance characteristics without compromising overall fitting integrity and leak-proof performance, and that minimizes and mitigates the blow-out or blow-off potential of the connection.

It is another object of the invention to provide a ferrule seal assembly that is designed for use in high-pressure, vibration, pulsation, and other applications.

It is a further object of the invention to provide a ferrule seal assembly that employs a single or multiple ferrules.

These and other objects of the invention are achieved through the provision of a tube fitting assembly, which comprises a cylindrical tube having an exterior surface, a longitudinal axis, and a tube end. The tube has a circumferential notch formed in the exterior surface adjacent the tube end. The notch is defined by a curved surface and a transverse surface, which extends substantially perpendicularly to the longitudinal axis of the tube.

The fitting assembly also comprises a first tube fitting member having an inner bore and an internally threaded end, said first tube fitting member being configured to receive the tube within the inner bore. A second tube fitting member has a central aperture extending through a length thereof, the second fitting member comprising an externally threaded end. A tube gripping member is mounted for sliding movement along exterior surface of the tube. The tube gripping member has a tapered front end configured to fit into the notch, when the second tube fitting member is pulled up, and seal the tube end.

The first tube fitting member can be a valve component, a conduit, a manifold, or any other device. The second tube fitting member is an externally threaded nut that partially fits into the bore of the first tubing member when pulled up. The tube gripping member is a ferrule with sufficient plasticity, allowing the front end of it to be deformed while being fitted into the notch. The flexing ability of the ferrule allows a partial bending of the ferrule sealing portion, which moves into a sealing contact with the tube end.

The notch on the tube body is partially defined by a curved or arcuate exterior surface of the tube. An arcuate camming surface is formed opposite the tube arcuate surface along the inner bore of the body, or the first tube fitting member. A space is defined between the arcuate surfaces of the tube and the body, and the tube gripping member, or ferrule fits tightly into said space when forced into a sealing position by the pulling up of the externally threaded nut.

DETAILED DESCRIPTION OF THE INVENTION

Figure 1:
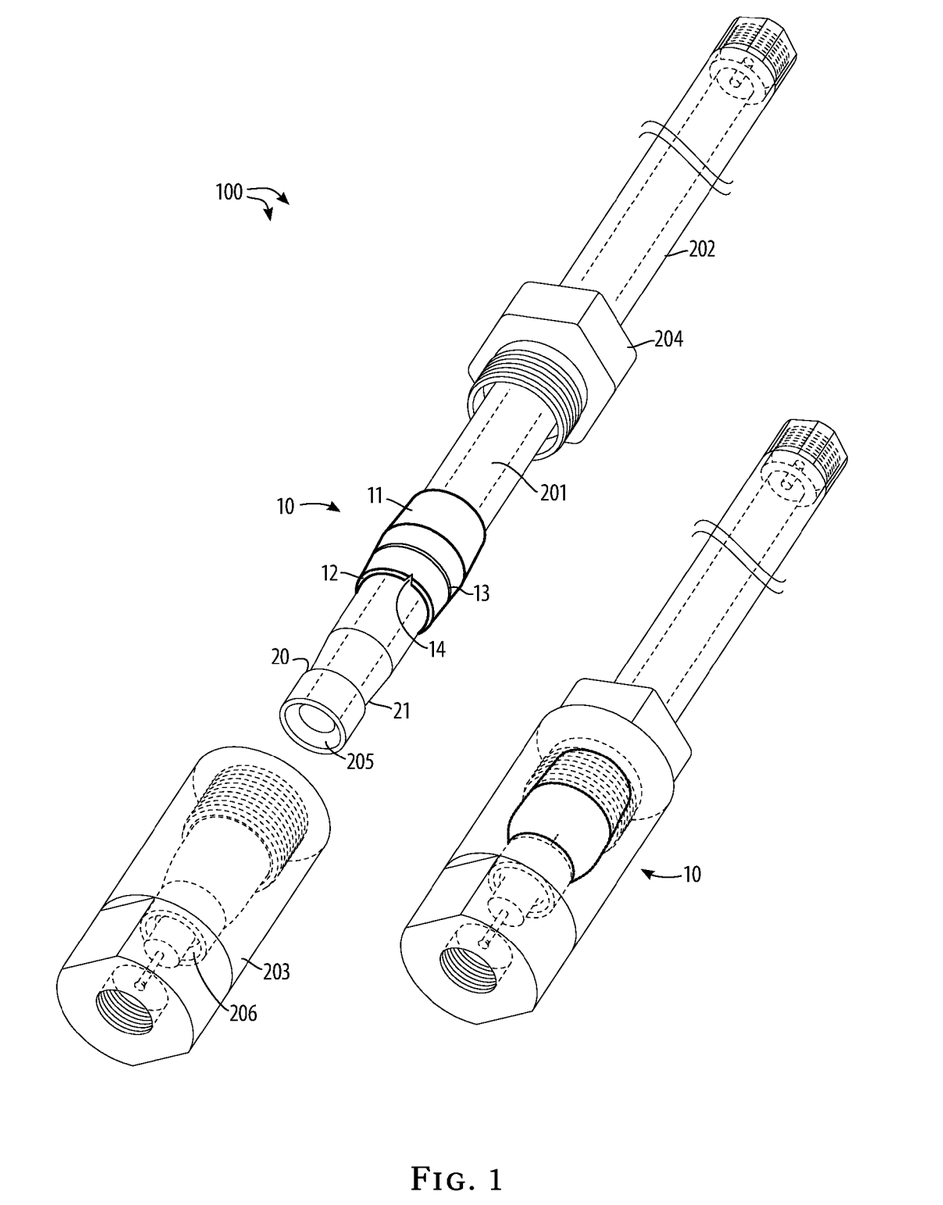
FIG. 1 is a schematic perspective view of the invention.

Referring to FIG. 1 and all figures generally, the tube-fitting-assembly method 100 and the tube-fitting-assembly ferrule apparatus 10 are shown in use schematically.

The invention is used with tubing, usually high-pressure tubing subject to vibrating, pulsating, or pounding, characterized by a tube channel 201 defined by a one or more tube-wall sections 202. The tubing sections are connected to other tubing sections or ultimately to devices by the operation of threaded sockets 203 and threaded plug-nuts 204. The end of the tube-wall section 202 is terminated with a section sealing surface 205 that seals against a socket sealing surface 206 that is built in to the threaded socket 203. The resulting seal is a point seal that circles the tube channel. It is this point seal that will be subjected to vibrating, pulsing, and pounding during normal operation of the tube assembly.

Figure 7:
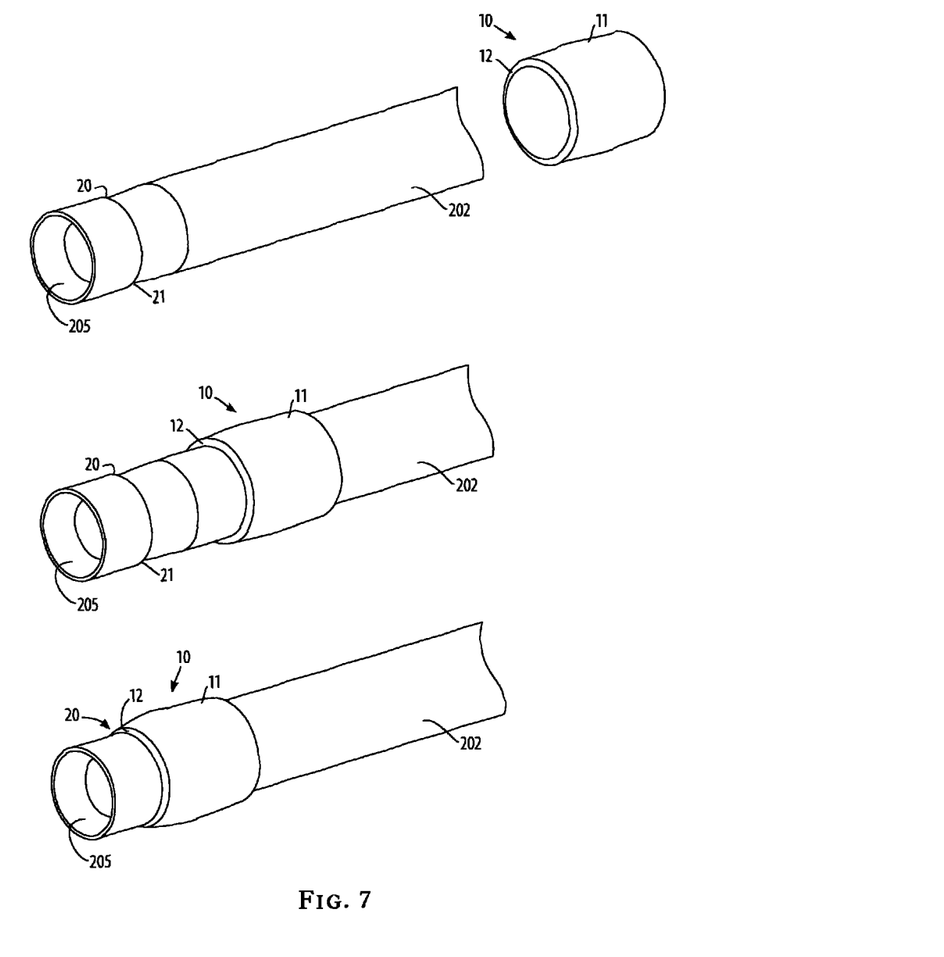
FIG. 7 is a perspective view of an embodiment of the invention, having a circumferential notch forming a transverse shoulder.
Figure 8:
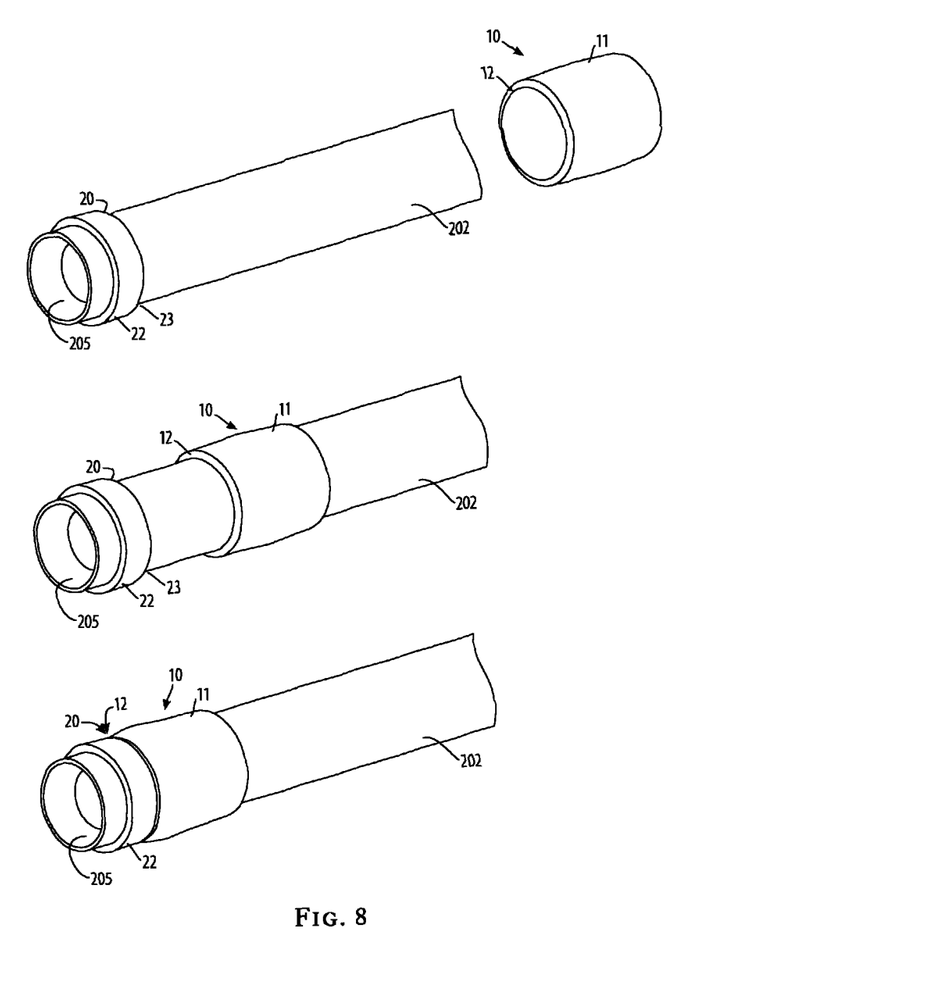
FIG. 8 is a perspective view of an embodiment of the invention, having a collar forming a transverse shoulder.

The invention provides a transverse shoulder 20 on the tube-wall section 202 near the section sealing surface 205. The transverse shoulder 20 provides a circumferential contact surface that will directly transmit sealing pressure to the section sealing surface 205. Referring briefly to FIG. 7, in an embodiment, the transverse shoulder 20 is created by removing a circumferential notch 21 of material from the tube-wall section. Referring briefly to FIG. 8, in another embodiment, the transverse shoulder 20 is created by adding a collar 22 to the tube section, creating a circumferential ledge 23. This collar 22 could be machined or constructed into the tube section, or could be added as a threaded, welded, pressed, or otherwise attached separate piece.

Figure 3:
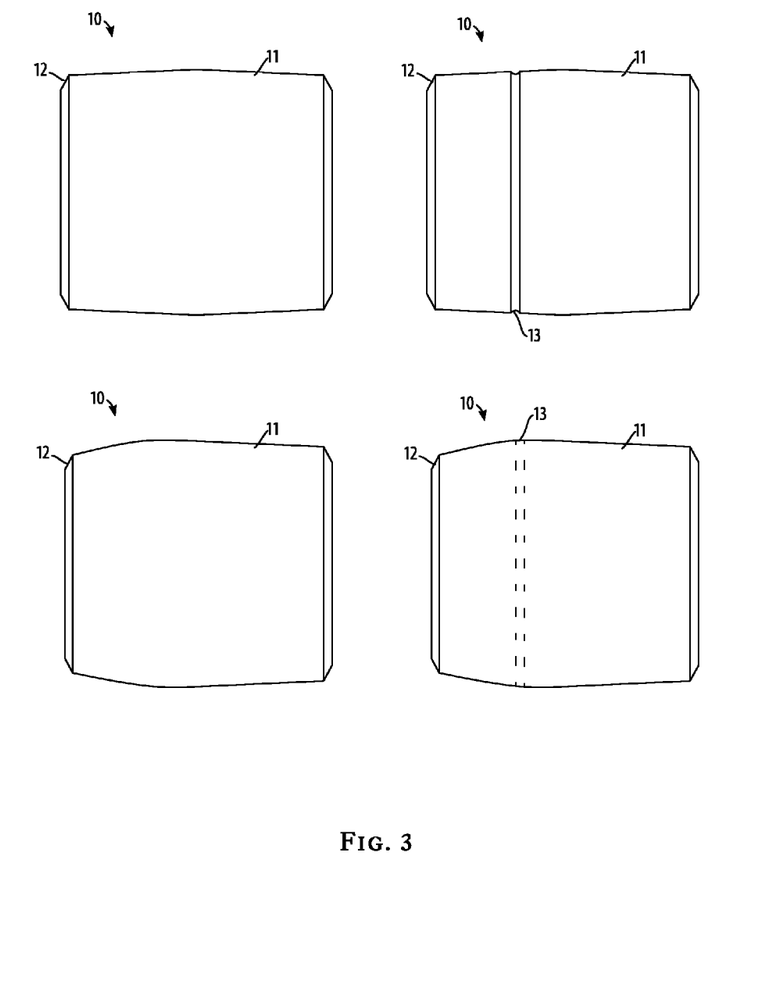
FIG. 3 is a side view of embodiments of the invention.
Figure 5:
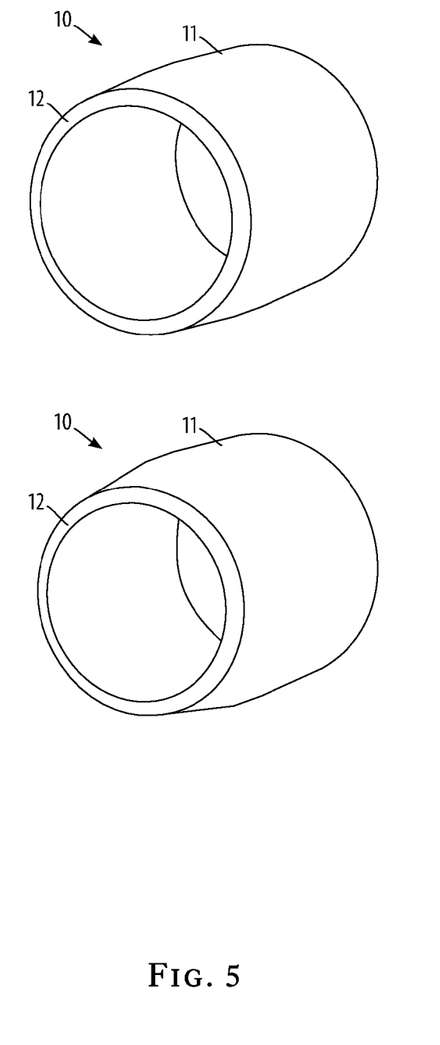
FIG. 5 is a perspective view of an embodiment of the invention.

Referring to FIG. 3 & FIG. 5, the tube-fitting-assembly ferrule 10 has a ferrule body 11 and a ferrule forward face 12. In use, the ferrule forward face will make circumferential contact with, and be compressed against, the transverse shoulder, and the ferrule body 11 will elastically deform so as to constrict or tighten the inner surface of the ferrule body against the tube and to expand or bulge the outer surface of the ferrule body against the inside of the threaded socket. When the angled ferrule forward face 12 is forced against the transverse shoulder 20, the angle promotes the constricting and bulging deformations at the desired places. Optionally, a groove or swale 13 can be made in the ferrule body 11 to provide a weakened area to further promote the desired deformations.

The constricting and bulging deformations undergone by the ferrule body 11 are elastic deformations, at least in part, depending upon the specific materials used in a given embodiment. The elasticity of the deformation, which can also be analyzed as stress, imparts a spring-like character to the deformed ferrule body 11, which functions similarly to an automobile shock absorber, and absorbs pulsations or hammering in the tubing, thereby maintaining the integrity of the circumferential point seal by reducing the tendency of the section sealing surface 205 and the socket sealing surface 206 to create a gouge or groove one against the other under pulsations of higher pressure, eventually compromising the integrity of the seal. Additionally, where such gouging or grooving occurs, the spring action presses the section sealing surface 205 and the socket sealing surface 206 more tightly together, restoring the integrity of the seal.

The shock-absorbing function of the elastically deformed ferrule body 11 can be complemented by a gripping function, or optionally a secondary-sealing function. Where the deformed ferrule body constricts around the tube-wall section 202 and bulges against the inner surface of the threaded socket 203, gripping surfaces are formed. These gripping surfaces strengthen the connection generally, and also provide a mechanism for a portion of vibration, pounding, or hammering stress to be transferred to such gripping surfaces through the shock-absorbing transfer through the deformed ferrule body 11. Optionally, such gripping surfaces can be designed to form a secondary seal.

Figure 4:
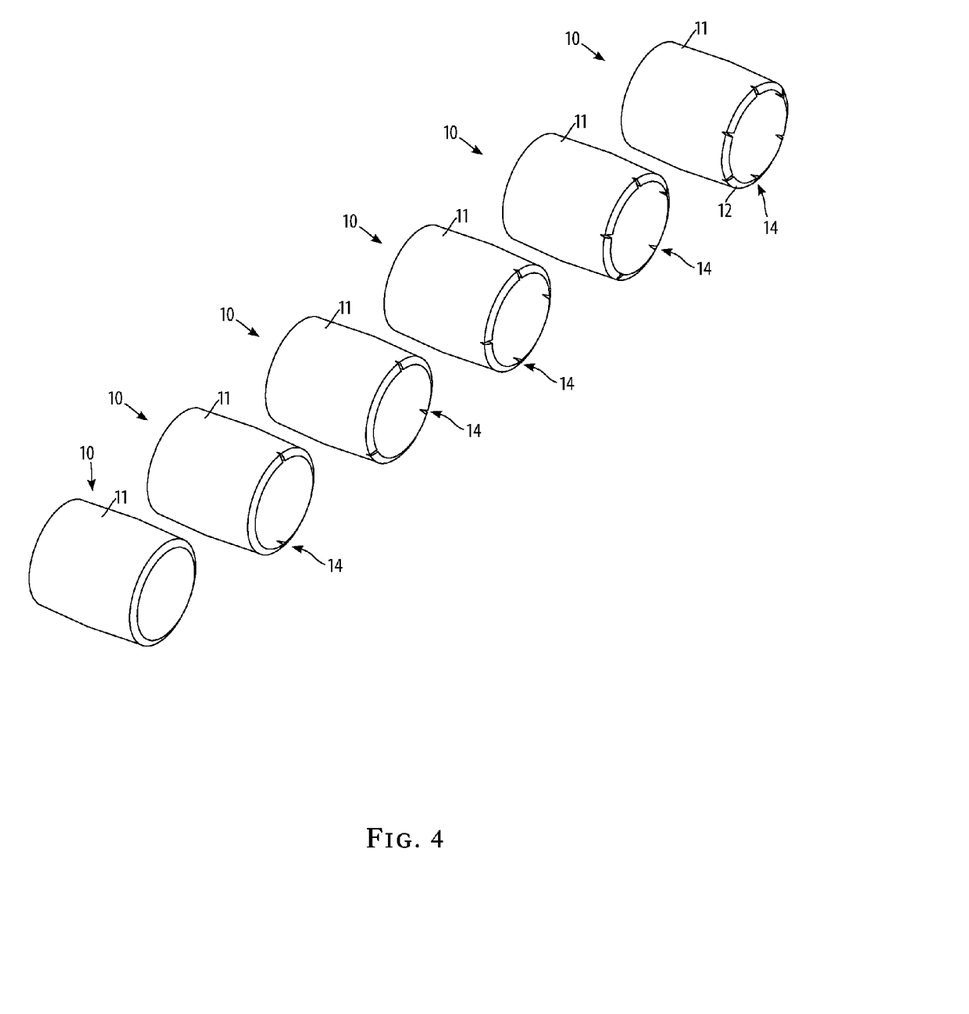
FIG. 4 is a perspective view of embodiments of the invention.
Figure 6:
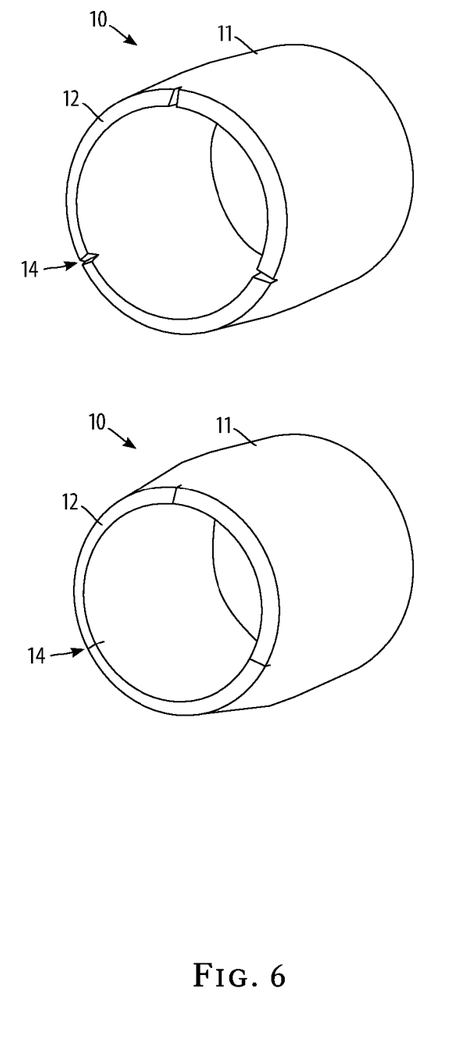
FIG. 6 is a perspective view of another embodiment of the invention, having cutouts.

Referring to FIG. 4 & FIG. 6, optionally, a number of cutouts 14 can be placed in the ferrule forward face 12 in order to promote or allow for deformation. Such notches might be needed for embodiments where the interaction of the size of the ferrule and the hardness of the chosen material create some resistance to the desired deformation.

Figure 2:
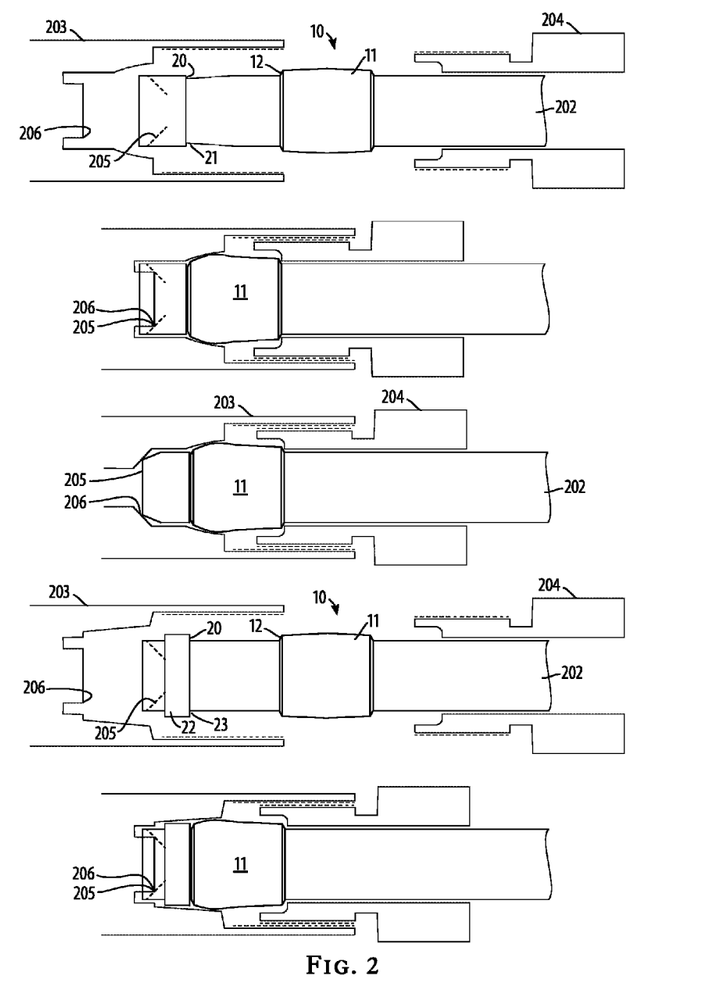
FIG. 2 is a schematic cutaway view of the operation of the invention.
Figure 9:
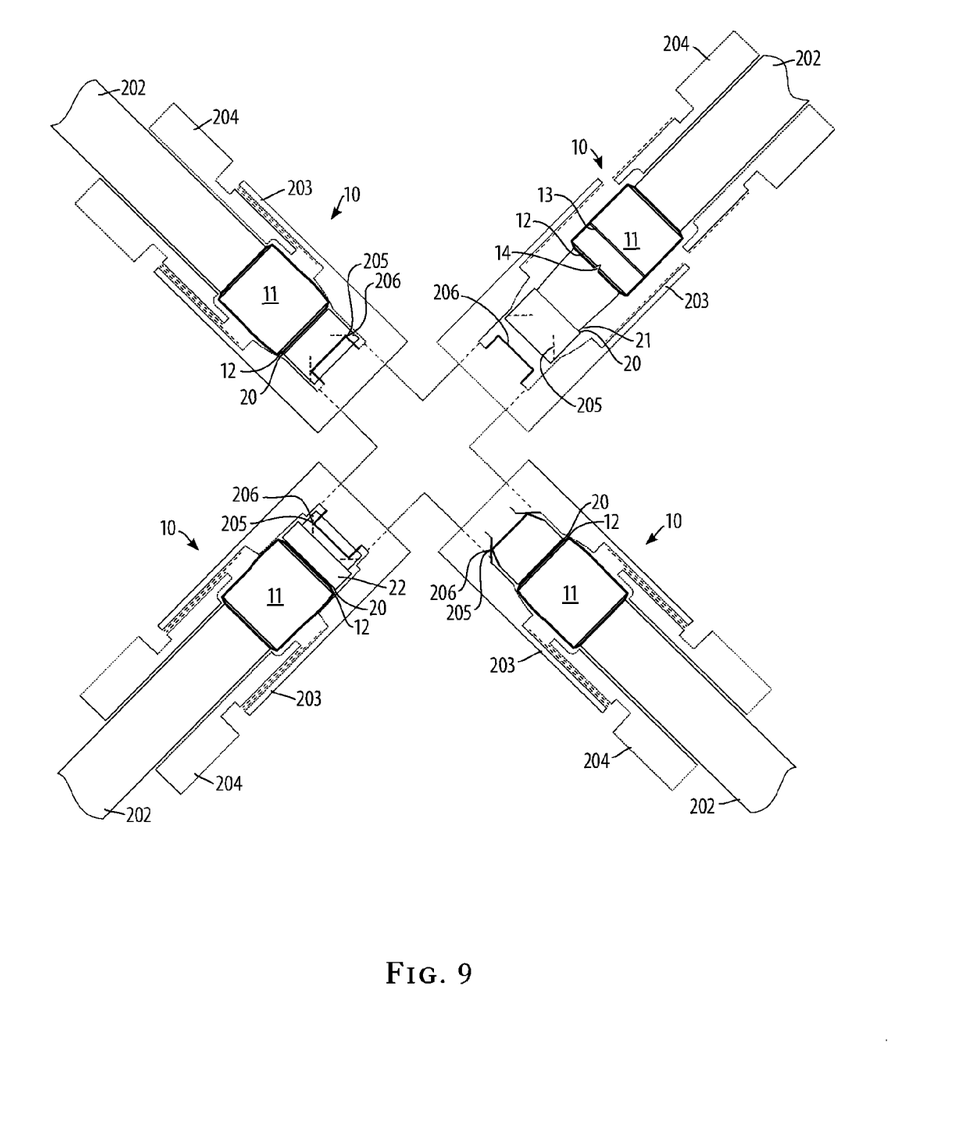
FIG. 9 is a schematic view of different embodiments of the invention in use.

Referring to FIG. 1, FIG. 2, & FIG. 9, in use, the invention provides a tube-fitting-assembly ferrule 10 having a ferrule body 11 and a ferrule forward face 12, which encircles a tube-wall section 202. The tube-wall section is placed into a threaded socket 203 and a threaded plug-nut 204 is installed behind the ferrule and into the threaded socket 203. The tightening of the threaded plug nut forces the ferrule forward face 12 against the transverse shoulder 20, which both (a) forces the section sealing surface 205 against the socket sealing surface 206 to form a circumferential point seal, and (b) deforms the ferrule body so that it constricts against the tube-wall section 202 and bulges against the inner wall of the threaded socket 203.

The tube-fitting-assembly ferrule 10 forms an exceptionally strong mechanical resistance to vibrations, pulsation, or pressure tending to break connection between the body and the tube. In many embodiments, the constricting and bulging deformations provide both (a) additional gripping surfaces and (b) a secondary seal. All embodiments provide an additional sealing pressure resulting from the elastic or partially elastic deformation of the ferrule body, because the elastically deformed ferrule body can absorb additional stress from pulsations of higher pressure, and can become less deformed, and "spring back" during pulsations of lower pressure.

In accordance with this invention, an efficient tube fitting is provided using a ferrule seal assembly. As the ferrule acts against the curved camming surface of a female threaded body, the ferrule forms additional annular seals at the front end of the ferrule. The features of this invention are particularly advantageous when the tube has high hardness characteristics and biting techniques, when the ferrule bites into the tube, are difficult to apply.

The components of the ferrule sealing assembly can be made of a noncorrosive material such as stainless steel, although identification of the material is intended to be exemplary in nature and should not be construed in a limiting sense. Those skilled in the art will readily appreciate that the invention may be realized using any number of different types of metal materials for the fitting components, as well as metal tubing materials, including ferritic stainless steel, any duplex stainless steel, any nickel alloy, any precipitation hardened stainless steel, brass, copper alloys, any carbon alloy steel, or other suitable materials. Furthermore, the ferrule sealing assembly need not be made of the same material as the tubing itself.

Although a number of aspects of the invention are described herein as being incorporated into the exemplary embodiments, such description should not be construed in a limiting sense. For any particular application the various aspects of the invention may be used as required in different combinations and sub-combinations thereof. Furthermore, although the present disclosure describes and/or illustrates a number of design choices and alternative embodiments, such descriptions are not intended to be and should not be construed as an exhaustive list of such choices and alternatives.

Many changes and modifications can be made in the present invention without departing from the spirit thereof. I, therefore, pray that my rights to the present invention be limited only by the scope of the appended claims.

I claim:

1. A tube-fitting-assembly ferrule for a tube-fitting assembly having sections of tube, each section of tube being operatively connected to other sections of tube, having a circumferential point-seal surface, longitudinal axis, transverse shoulder, a threaded socket, said threaded socket having an interior and outer surface, and threaded plug-nut, the tube-fitting-assembly ferrule comprising:
   (i) a ferrule body adapted to encircle the longitudinal axis of the tube, having an inner and outer surface in relation to the tube, and having a forward end oriented toward the transverse shoulder and the threaded socket; and
   (ii) a ferrule forward face on said forward end of said ferrule body, adapted to contact the transverse shoulder at an angle which promotes a desired deformation of said ferrule body upon compression;
wherein said tube-fitting assembly further comprises a first tube fitting member having an inner bore and an internally threaded end, said first tube fitting member being configured to receive the tube within the inner bore, and a second tube fitting member having a central aperture extending through a length thereof, the second fitting member comprising an externally threaded end;
where pressure applied by the threaded plug nut against a rearward end of said ferrule body compresses said ferrule forward face against the transverse shoulder, producing a deformation constricting said inner surface of said ferrule body against the tube exterior surface, and bulging said outer surface of said ferrule body against the threaded socket interior surface; and
where said deformations of said ferrule body create an additional sealing force against the circumferential point-seal surface between the connected tube sections.

2. The tube-fitting-assembly ferrule of claim 1, further comprising a circumferential groove.

3. The tube-fitting-assembly of claim 1, further comprising at least one cutout on said ferrule front face.

4. The tube-fitting-assembly ferrule of claim 1, further comprising a circumferential notch defining said transverse shoulder.

5. The tube-fitting-assembly ferrule of claim 4, wherein an arcuate camming surface is formed in said inner bore opposite the notch.

6. The tube-fitting-assembly ferrule of claim 4, wherein said notch is defined by a first arcuate surface and a second straight surface extending transversely to the longitudinal axis of the tube.

7. The tube-fitting-assembly ferrule of claim 6, wherein the arcuate camming surface extends a distance from the first arcuate surface, and wherein the forward end of the tube-fitting-assembly ferrule fits between the arcuate camming surface and the first arcuate surface when sealing the tube end.

8. The tube-fitting-assembly ferrule of claim 6, wherein the forward end of the tube-fitting-assembly ferrule is configured to plastically deform along the first arcuate surface of the tube when the tube-fitting-assembly ferrule is in a sealing engagement with the tube.

9. The tube-fitting-assembly ferrule of claim 4, wherein said tube-fitting-assembly ferrule has plasticity and resiliency sufficient to deform and partially fit into the notch when the first tube fitting member is tightened against the second tube fitting member.

10. The tube-fitting-assembly ferrule of claim 4, wherein the tube-fitting-assembly ferrule comprises a tapered front end configured to fit into the notch.

11. The tube-fitting assembly ferrule of claim 1, further comprising a collar defining said transverse shoulder.

12. The tube-fitting-assembly ferrule of claim 1, wherein the internally threaded end of the first tube fitting member is configured to threadably engage with externally threaded end of the second tube fitting member.

13. The tube-fitting-assembly ferrule of claim 1, wherein the second tube fitting member is provided with a drive shoulder configured to engage a back end of the tube-fitting-assembly ferrule.

14. The tube-fitting-assembly ferrule of claim 1, wherein the threaded end of the first tube fitting member is configured to receive the threaded end of the second tube fitting member when the second fitting member is pulled up.

15. The tube-fitting-assembly ferrule of claim 1, wherein the tube, the first tube fitting member, the second tube fitting member, and the tube-fitting-assembly ferrule are formed of metal or metal alloy.

16. The tube-fitting-assembly ferrule of claim 1, wherein the second tube fitting member is a nut.

17. A tube-fitting-assembly method comprising:
   (i) providing a tube-fitting assembly having sections of tube, each said section of tube being operatively connected to other sections of tube, having a circumferential point-seal surface, longitudinal axis, transverse shoulder, a threaded socket, said threaded socket having an interior and outer surface, and threaded plug-nut; and
   (ii) providing a tube-fitting-assembly ferrule comprising:
      (a) a ferrule body adapted to encircle the longitudinal axis of the tube, having an inner and outer surface in relation to the tube, and having a forward end oriented toward the transverse shoulder and the threaded socket; and
      (b) a ferrule forward face on said forward end of said ferrule body, adapted to contact the transverse shoulder at an angle which promotes a desired deformation of said ferrule body upon compression;
   where pressure applied by the threaded plug nut against a rearward end of said ferrule body compresses said ferrule forward face against the transverse shoulder, producing a deformation constricting said inner surface of said ferrule body against the tube exterior surface, and bulging said outer surface of said ferrule body against the threaded socket interior surface; and
   where said deformations of said ferrule body create an additional sealing force against the circumferential point-seal surface between the connected tube sections.

* * * * *